C. A. LEE.
ADJUSTABLE FRICTION HINGE.
APPLICATION FILED MAY 11, 1915.
1,211,186. Patented Jan. 2, 1917.
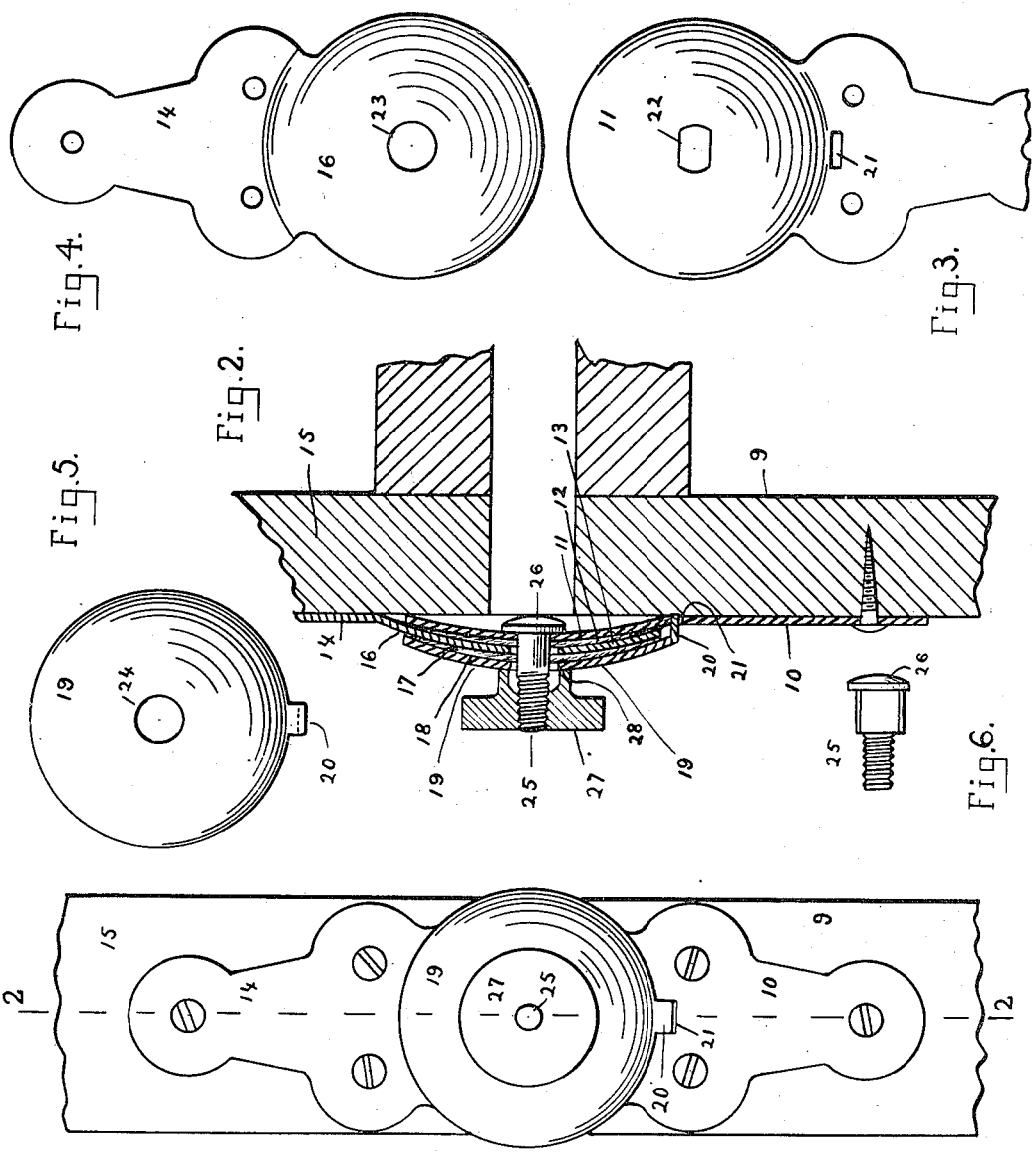

UNITED STATES PATENT OFFICE.

CHARLES A. LEE, OF ONEIDA, NEW YORK.

ADJUSTABLE FRICTION-HINGE.

1,211,186.  Specification of Letters Patent.  Patented Jan. 2, 1917.

Application filed May 11, 1915. Serial No. 27,451.

*To all whom it may concern:*

Be it known that I, CHARLES A. LEE, of Oneida, in the county of Madison and State of New York, have invented certain new and useful Improvements in Adjustable Friction-Hinges; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to frictional hinges.

The hinge herein described is particularly adapted for pivotally or hingedly connecting a head rest to a chair back or to a couch, a chair back to a chair, a back support to a couch or to a reclining chair or for connecting to each other the different parts of various swinging arms or supporting brackets. It will be understood, however, that this friction joint may be advantageously applied to a great variety of other places in furniture, fixtures, machinery and other articles where it is desired to connect two elements by a friction joint which may be readily adjusted in desired tension.

The purpose of my present invention is to provide an improved adjustable friction hinge that is simple and economical in construction, efficient and durable in use and which is adapted to be readily adjusted preferably by hand to varying degrees of tension or friction according to the requirements of the place where used.

Another purpose of my invention is to provide a hinge of the character described which while maintaining a simple form of hinge has a double set of coöperating friction faces whereby without unduly increasing the size of the hinge or its complexity a sufficient amount of friction is at all times attainable according to the purpose for which the hinge is being used.

A further purpose of my invention is to provide a hinge which has efficient and simple means adapted to maintain said hinge at any desired point of frictional pressure and that is adapted to hold the members of the hinge and the pressure exerting means thereof from displacement relative to each other as the hinge is operated.

A still further purpose of my invention is to provide a frictional hinge of three friction members namely two hinge members with friction faces and a friction plate resulting in two pairs of coöperating friction faces with one friction member relatively mounted between the other friction member and the friction plate which two latter members are mounted in non-rotative position relative to each other whereby adjustable screw-threaded means may engage said outer friction members and be adjusted at will thereupon without having their adjustment disturbed by the operation of the hinge.

Another object of my invention is to provide a hinge of the character described which has the pressure of its friction faces exerted at some distance from its pivoting point so as to obtain greater strength, permanence and efficiency in the friction hinge and also so as to obtain a certain amount of resiliency in the friction members between the point of compression and the active friction points resulting in greater equality and durability of action. I preferably accomplish this by means of having the opposing faces of each pair of coöperating friction faces respectively concave and convex with the concavity of one face being greater than the convexity of its coöperating face. A further purpose of this cupped arrangement is to make the hinge more uniform in its action and to strengthen the same making more of the pivotal strain fall upon the hinge members instead of all upon the hinge pivot as would be the case were the friction faces flat.

Figure 1 is a face or plan view of an adjustable friction hinge embodying my invention. Fig. 2 is a sectional view on line 2—2 of Fig. 1. Fig. 3 is a plan view of the first or outer hinge member. Fig. 4 is a plan view of the second or inner hinge member. Fig. 5 is a plan view of the friction plate. Fig. 6 is a side view of the preferred form of screw-threaded bolt used in the hinge illustrated.

Referring to the drawings in a more particular description, there is shown suitably secured to the side or end of one part 9 of the given article the base or bracket portion of the first or inner hinge member 10 provided with a friction face 11 preferably circular in form and also preferably convex as viewed from the outside as seen in Fig. 2. In order to obtain greater durability and noiselessness of action, over this friction face 11 is placed a washer 12 of friction material such as leather or other suitable substance. Fitting over these is placed the friction face 13 of the outer or second hinge member 14 the base portion of which is secured to the adjacent side or end of the other part 15 of the article which is to be equipped with the hinge. The friction face 13 is concave and preferably of greater concavity than the convexity of the convex friction face 11 and is of similar shape and size. The surface of hinge member 14 opposite its friction face 13 is also formed as a friction face 16 and is also preferably convex. Thereupon is preferably placed another friction washer 17 similar to friction washer 12. Over these is placed the concave friction face 18 of friction plate 19 which is preferably circular and of a size corresponding to the friction face 16. The concavity of friction face 18 is preferably greater than the convexity of its opposing friction face 16.

The friction plate 19 is held in non-rotative position relative to the first or inner hinge member 10 by being provided with an ear 20 extending beyond the general periphery of friction plate 19 and so beyond the periphery of the contact portion of the inner hinge member 14 and its friction faces 13 and 16 and then turned inwardly and closely fitted into an aperture 21 provided in the base portion of outer hinge member 10 just outside its friction face 11.

Through centrally disposed apertures 22, 23 and 24 in the contact portions of hinge members 10 and 14 and friction plate 19 respectively extends the shank of a bolt 25 the enlarged head 26 of which bears against the inner or free surface of contact portion of hinge member 10 adjacent to its aperture 22 while upon the screw-threaded end of the bolt 25 is placed a thumb nut 27 the inner face 28 of which bears against the outer surface of friction plate 19 adjacent its aperture 24. It is obvious that when desired the head of the bolt may be placed against the outer surface of friction plate 19 and the thumb nut 27 may be placed upon the then inwardly extending screw-threaded end of the bolt without departing from the spirit of this invention, but for most purposes it is more convenient to have the adjusting nut in a more exposed position in order to permit the same to be readily adjusted.

It will now be seen that the screw-threaded means for obtaining and adjusting the frictional tension of this hinge bear upon the free side of the inner hinge member and upon the outside of the friction plate which members are held in non-rotative position relative to each other. Therefore it will be obvious that the hinge may be operated either by having the inner hinge member swung about pivotally between the outer hinge member and plate 19 or by having the outer hinge member and plate 19 swung about the inner hinge member 14 without disturbing the adjustment of the screw-threaded tension means. It will be obvious further that this tension means may be readily set at any desired tension as found desirable for the purpose in hand or may be loosened or tightened from time to time as desired and that the operation of the hinge as aforesaid will not disturb such adjustment. As an additional precaution, however, against any loss of adjustment the shank of bolt 25 near its head 26 will be flattened on two sides as plainly indicated in Figs. 2 and 6 so as to fit an aperture having two straight sides as indicated by the shape of aperture 22 in Fig. 3. This arrangement will operate to positively hold the bolt 25 in non-rotative position relative to the inner hinge member 10 and thereby will prevent any possibility of the inner hinge member 14 moving said bolt by reason of the contact of its edge adjacent to its aperture 23 against said bolt.

The friction faces may be flat as far as the non-displacement of the adjusting means is concerned but I prefer to have them made concave and convex fitting one within the other as such construction stiffens the friction faces so that they may be stamped up out of thinner material than would otherwise be usable and because this arrangement seems to obtain a more efficient fit between the friction faces resulting in a more regular degree of friction and greater durability thereof.

As hereinbefore stated preferably the concave friction faces are of slightly greater concavity than the convexity of their cooperating friction faces. This difference in curve results when no friction washers are used, in the friction faces meeting near their periphery but being slightly separated for some distance from their center; or where the washers are used, said difference of curve results in the friction faces engaging the washer much tighter out near their periphery. In either case the pressure of the frictional contact is thrown toward the outer edges of the friction faces thereby obtaining greater leverage of resistance or power in the friction hinge. Another object attained by this greater pressure toward the edges of the friction faces is that there is given to the hinge greater strength, equality and durability of action in that there is a certain amount of resiliency in the friction faces due to the compression means acting upon the outer sides of said friction members at their center while the frictional contact or pressure is obtained not near the center of the friction faces but toward their outer edges, so that under compression the centers of the faces may spring slightly together.

It will be noted that the friction hinge now described has four friction surfaces making two pairs of coöperating frictionally engaged surfaces instead of one pair and it will be obvious likewise that this increase of frictional surface will in effect double the strength of the friction hinge to resist movement. The additional frictional surface also tends to greater durability and evenness in action. Moreover the gripping of hinge member 14 between hinge member 10 and friction disk 19 produces greater strength and rigidity in the hinge as the friction faces cannot spring away from each other when so assembled.

It will be noted that this friction hinge is adapted for use in positions where no movement is desired under ordinary circumstances, but where the parts may be moved by the use of greater power to a new position and there remain against ordinary pressure; or by sufficiently tightening up the nut the hinge may be used in places where the rigid joint is desired against all probable pressure, but where by reducing the tension of the hinge the connected parts may be moved to another angle and there again fixed without the use of any tools upon the hinge.

I claim:

1. In an adjustable friction hinge, a hinge member having a friction face, a separate friction plate spaced therefrom, an ear on one of said members beyond its friction face entering into an aperture provided in the other member beyond its friction face and adapted to hold said members in non-rotative position relative to each other, a second hinge member rotatively mounted between said first hinge member and said friction plate and having friction faces coöperating therewith respectively and having a portion extending radially from between said first hinge member and said friction plate whereby said second hinge member may be secured to the desired object, a headed bolt extending through the friction faced portions of said three members and a nut in screw threaded engagement with the extended end of said bolt and bearing upon one of said outer members and adapted to adjust the tension of said friction hinge.

2. In an adjustable friction hinge, a hinge member having a friction face, a separate friction plate spaced therefrom, an ear on one of said members beyond its friction face entering into an aperture provided in the other member beyond its friction face and adapted to hold said members in non-rotative position relative to each other, a second hinge member rotatively mounted between said first hinge member and said friction plate and having friction faces coöperating therewith respectively and having a portion extending radially from between said first hinge member and said friction plate whereby said second hinge member may be secured to the desired object, a headed bolt extending through the friction faced portions of said three members and mounted non-rotatively relative to one of the outer members and a nut in screw threaded engagement with the extended end of said bolt and bearing upon one of said outer members and adapted to adjust the tension of said friction hinge.

3. In an adjustable friction hinge, a hinge member having a friction face, a separate friction plate non-rotatively mounted relative to the first hinge member, a second hinge member rotatively mounted between said first hinge member and said friction plate and having friction faces coöperating therewith respectively and having a portion extending radially from between said first hinge member and said friction plate whereby said second hinge member may be secured to the desired object, a headed bolt extending through the friction faced portions of said three members and non-rotatively mounted relative to one of the outer members and a nut in screw threaded engagement with the extended end of said bolt and bearing upon one of said outer members and adapted to adjust the tension of said friction hinge.

In witness whereof I have affixed my signature, in the presence of two witnesses, this 5th day of October, 1914.

CHARLES A. LEE.

Witnesses:
 HARRIETT WILLIAMS,
 JAMES E. BREMER.